P. LAVELLE.
VEHICLE TIRE.
APPLICATION FILED SEPT. 25, 1917.
1,257,366. Patented Feb. 26, 1918.
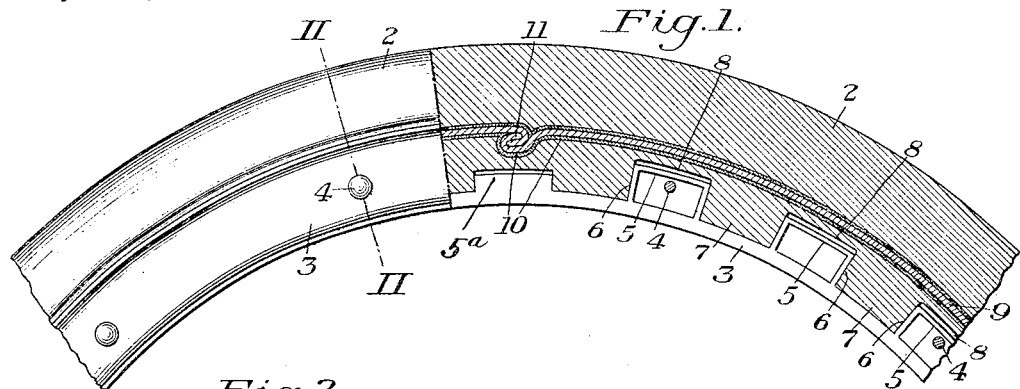
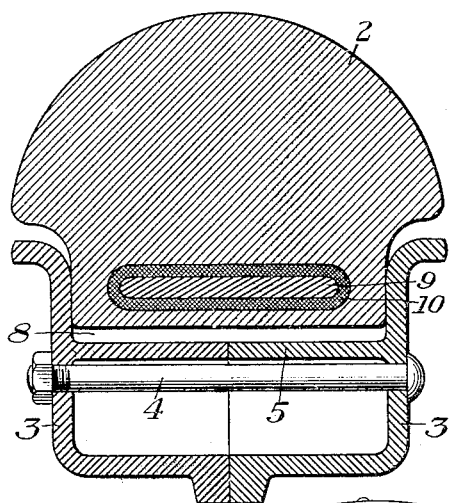
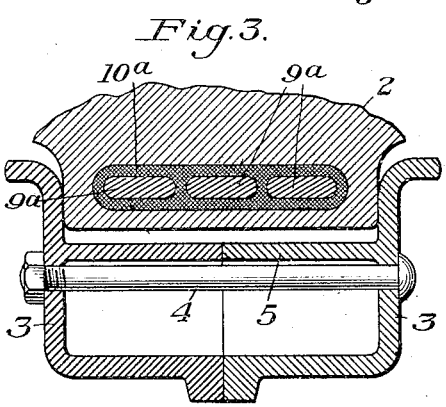
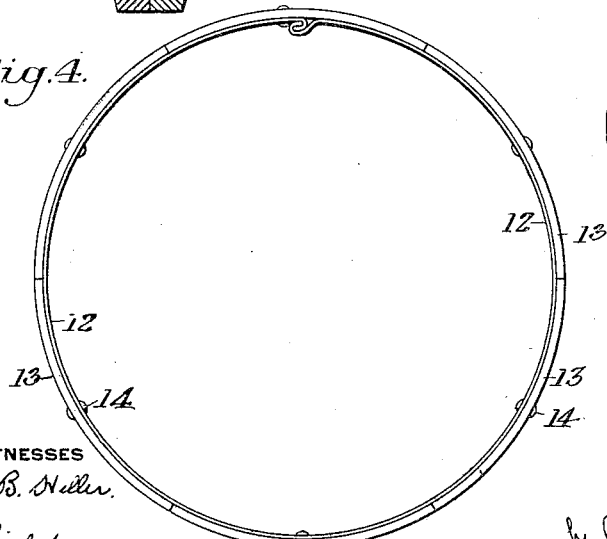
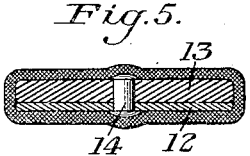
WITNESSES
INVENTOR

UNITED STATES PATENT OFFICE.

PATRICK LAVELLE, OF JOHNSTOWN, PENNSYLVANIA.

VEHICLE-TIRE.

1,257,366.  Specification of Letters Patent.  Patented Feb. 26, 1918.

Application filed September 25, 1917. Serial No. 193,076.

*To all whom it may concern:*

Be it known that I, PATRICK LAVELLE, a citizen of the United States, residing at Johnstown, in the county of Cambria and State of Pennsylvania, have invented a new and useful Improvement in Vehicle-Tires, of which the following is a full, clear, and exact description, reference being had to the accompanying drawings, forming part of this specification, in which—

Figure 1 is a view partly in side elevation and partly in section of a portion of a vehicle tire embodying my invention.

Fig. 2 is a section on the line II—II of Fig. 1, on a larger scale.

Fig. 3 is a transverse section showing a modification.

Fig. 4 is a side elevation of a modified form of the spring member, and

Fig. 5 is a detail sectional view showing a section of the spring of Fig. 4 and its covering.

My invention has relation to vehicle tires, and more particularly to vehicle tires of the class wherein the desired resiliency is obtained by the use of a spring or springs embedded in a rubber body portion.

The object of my invention is to provide a vehicle tire of this character which can be readily manufactured, which will have the rquired degree of resiliency and which will be durable and serviceable in its use.

Referring first to that form of my invention shown in Figs. 1 and 2, the numeral 2 designates the tread portion of the tire and 3 the rim member in which the tire is seated. This rim member is of trough or channel form, and is formed in two laterally separable sections which can be secured together by means of the bolts 4. It is formed at intervals with a plurality of outwardly extending radial projections 5, which may be of hollow form and which are adapted to engage radial pockets 6 formed in the inner portion of the body of the tire, the latter having the inward projections 7 fitting between the projections 5. Preferably the projections 5 will not extend the full depth of the pockets 6, but spaces 8 will be left which act as air cushions to increase the resiliency of the tire under sudden shocks.

9 designates a spring member which is molded within the body of the tire at a point intermediate the pockets 6 and its outer tread surface. In the form shown in Figs. 1 and 2, this spring is in the form of a flat steel band having a suitable fabric covering 10 in which it is incased, the whole being molded and embedded in the tire body. The spring extends completely around the tire, its meeting ends being suitably connected by lipping them together, as shown at 11 in Fig. 1. The radial projection 5ª adjacent to the connection 11 of the ends of the spring 9, is shown as being shorter than the projections 5.

In the modification shown in Fig. 3, the construction is the same as that first described, except that in place of a single steel band, three narrow spring bands 9ª are used, these being arranged side by side and incased in suitable coverings 10ª; two, three or more springs may be used.

In the modification shown in Figs. 4 and 5, the spring is composed of a continuous inner member 12 of relatively thin metal and an outer member 13 of sectional form, the sections of which are suitably secured by rivets 14 to the inner member. The form of spring shown in these figures is to be embedded in the tire body in the same manner as in the figures above described.

A tire constructed in accordance with my invention possesses a high degree of resiliency; it is securely held within the rim member and prevented from any creeping relatively to the same, and is capable of being readily manufactured.

I do not limit myself to the details of construction of the tire body and rim member as herein shown and described, since changes may be made in the construction of these parts within the spirit and scope of the appended claims.

I claim:

1. The combination with a sectional rim member of trough or channel form, having a plurality of projections formed with substantially radial faces, of a tire comprising a substantially solid body formed with radial projections on its inner circumference, said projections also having substantial radial faces and fitting the spaces between the rim projections, and a spring member embedded in said body; substantially as described.

2. The combination with a sectional rim member of trough or channel form, having a plurality of projections formed with substantially radial faces, of a tire comprising a substantially solid body formed with radial projections on its inner circumference, said projections also having substantial radial faces and fitting the spaces between the rim projections, the ends of the projections on the tire seating on the rim member between its said projections, said rim projections being shorter than the projections on the tire body; substantially as described.

In testimony whereof, I have hereunto set my hand.

PATRICK LAVELLE.